United States Patent [19]
Peck

[11] 4,211,828
[45] Jul. 8, 1980

[54] THERMOELECTRIC ENERGY SYSTEM

[75] Inventor: Robert L. Peck, Windham Center, Conn.

[73] Assignee: Atlantic Richfield Company, Los Angeles, Calif.

[21] Appl. No.: 959,058

[22] Filed: Nov. 9, 1978

[51] Int. Cl.² .............................................. H01M 6/36
[52] U.S. Cl. ...................................... 429/11; 429/112
[58] Field of Search ................................... 429/11, 112

[56] References Cited
U.S. PATENT DOCUMENTS

| | | | |
|---|---|---|---|
| 2,882,329 | 4/1959 | Liebhofsky | 429/11 |
| 3,253,955 | 5/1966 | Clampitt et al. | 429/11 |

*Primary Examiner*—Charles F. LeFevour
*Attorney, Agent, or Firm*—Fishman and Van Kirk

[57] ABSTRACT

A thermoelectric energy system comprising first and second separated metal electrodes, an electrolyte comprising a source of metal ions and a material for complexing the metal ions to form a metal ion complex, the electrolyte being disposed between and in contact with the electrodes to provide a metal ion conduction path which extends substantially the entire distance between the electrodes. A temperature gradient is imposed between the electrodes to produce a voltage across the electrodes. An electric circuit is connected to the electrodes to allow for removal of electrical energy from the system.

42 Claims, 6 Drawing Figures

Log-Log Plot of Ri vs I

FIG. 6

THERMOELECTRIC ENERGY SYSTEM

BACKGROUND OF THE INVENTION (1) Field of the Invention

The invention relates to thermoelectric energy systems which convert thermal energy into electrical energy. More particularly, the invention relates to a thermoelectric apparatus and a method for converting thermal energy to electrical energy.

(2) Description of the Prior Art

It is known that electrical power can be produced from a thermoelectric cell comprising an electrolyte disposed between two metal electrodes. One type of thermoelectric cell is disclosed in U.S. Pat. No. 3,253,955. This patent discloses an apparatus for obtaining electrical energy from heat energy. One thermoelectric cell disclosed in this patent comprises a container which is divided into chambers or compartments. An ion bridge is positioned between the two chambers and copper electrodes are positioned within each chamber. Each container is filled with an aqueous copper sulfate electrolyte. An aperture is provided between the chambers and an ion bridge is mounted in the aperture. It is stated that the ion bridge can be a sintered glass ion bridge, a porous disc, a salt bridge, an agar-agar salt bridge, an ion permeable membrane, pure difusion (no separation), or other suitable types of bridges known to the art. This patent also states that the cell is reversible, that is, the temperature differential of the cell can be reversed to provide for movement of the copper ions in a reverse direction.

A second type of thermoelectric cell is disclosed in Electrolyte Thermal Piles, Vesz Pren, Hungary (1971), Vol. 1, Hoffman and David. This article discloses a thermoelectric cell comprising an aqueous copper sulfate electrolyte disposed between two metallic copper electrodes. A temperature differential is imposed between the electrodes by heating one electrode and allowing the other electrode to remain at room temperature. A potential difference and a current can be measured between the two copper electrodes. As the temperature differential is applied to the copper electrodes and the cell begins to generate power, the electrodes may become caked or scaled so as to inhibit the further generation of power.

Moreover, a cell of the type disclosed by Hoffmann and David has another drawback. When the temperature difference is applied to the electrodes in the electrolyte, the current output through a constant load decays over a period of time. It is believed that this decay in current output is caused by polarization occurring between the electrodes within the electrolyte and/or by formation of caking or scaling such as oxides or sulfates.

Another type of cell is disclosed in U.S. Pat. No. 2,882,329. This cell comprises two electrodes of the same composition separated by a cation permeable exchange resin membrane which is said to be the sole electrolyte in direct contact with the electrodes. This patent teaches that aqueous electrolytes should not be used in the cell.

It is an object of the present invention to provide a thermoelectric energy system having a relatively high power output.

It is another object of the present invention to provide a thermoelectric energy system which reduces or eliminates corrosion, pitting, scaling or uneven dissolution of electrodes in the system.

It is another object of the present invention to provide a thermoelectric energy system which can be operated without frequent replacement of the electrodes and frequent replenishment of the electrolyte.

It is another object of the present invention to reduce polarization occurring during operation of the thermoelectric energy system.

It is still another object of the present invention to provide a thermoelectric energy system which provides a relatively constant current through a constant load over a relatively long period of time.

SUMMARY OF THE INVENTION

The thermoelectric energy system of the present invention includes a thermoelectric cell comprising at least a first and a second separated metal electrode and a liquid electrolyte comprising a source of metal ions and a material for complexing the metal ions to form a metal ion complex, the electrolyte being disposed between and in contact with the electrodes to provide a metal ion conduction path which extends substantially the entire distance between the electrodes. A temperature differential or gradient is imposed between the electrodes to produce a voltage across the electrodes. An electrical circuit is connected to the electrodes to allow for removal of electrical energy from the cell. One particularly novel aspect of the system of the present invention is to provide an electrolyte wherein the electrolyte includes a material for complexing the metal ions to thereby form a metal ion complex.

In the preferred embodiment of the invention, the electrodes comprise two metallic copper electrodes and the electrolyte comprises a source of copper metal ions, the source being, for example, copper sulfate or copper fluoroborate. The complexing agent for the copper ions can be selected from any number of conventional copper ion complexing agents such as tartrates, ethylenediaminetetracetic acid and/or gluconates. In addition or as a substitute for the above-described conventional copper ion complexing agents, the material for complexing the copper ion may be a silica gel, or powder.

One important advantage of the thermoelectric energy system of the present invention is that the system is capable of providing a relatively constant current across a load. It is also believed that the inclusion of a complexing material for the metal ions reduces or eliminates the polarization occurring between the electrodes and the electrolyte. Furthermore, the formation of caking or scaling on the electrodes is reduced or eliminated: in thermoelectric cells according to the present invention, a smooth, matted surface is maintained on each of the electrodes as the cell produces power in response to a temperature differential imposed between the electrodes.

DETAILED DESCRIPTION OF THE INVENTION

Figure 1:
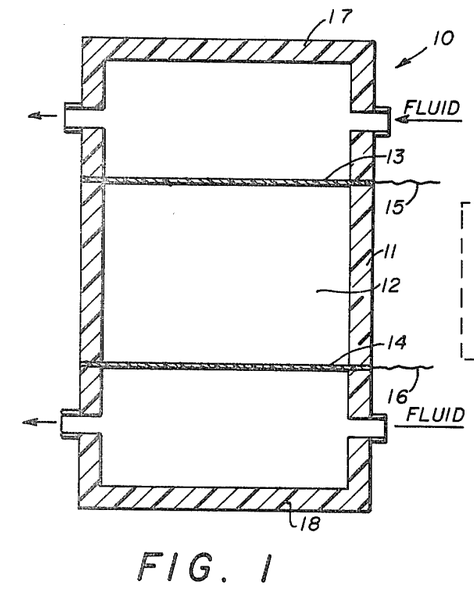
FIG. 1 is a schematic side sectional view of a thermoelectric cell.

FIG. 1 is a schematic diagram of a thermoelectric energy system of the present invention. Cell 10 comprises a container 11 which is preferably made from a material which does not react to a significant degree with the liquid electrolyte 12 disposed within container 11. Container 11 is preferably made from glass or teflon. Electrodes 13 and 14 are positioned in contact with electrolyte 12. Conductive electric wires 15 and 16 are connected respectively to electrodes 13 and 14 and provide for removal from cell 10 of electric power generated by the cell. Although as shown in the schematic diagram, the electrodes 13 and 14 are coplanar, in practice, the electrodes may have any geometry or orientation provided they are separated from each other by the electrolyte. Mounted on either side of electrodes 13 and 14 are heat transfer chambers 17 and 18 through which fluid may be circulated to either cool or heat electrodes 13 and 14 and provide a temperature differential within electrolyte 12. It should be understood that any apparatus which allows for the provision of a temperature differential between electrodes disposed within the electrolyte may be used. The schematic diagram shown in FIG. 1 is merely one example of numerous constructions that could be used in connection with the present invention. When a temperature differential is imposed between electrodes 13 and 14, an emf is developed between the electrodes, the emf being a function to the temperature gradient.

One surprising and unexpected result achieved by the system of the present invention is the provision of a cell in which the formation of caking or scaling on the electrodes is reduced or eliminated. During the generation of power and the transference of metal from one electrode to the other electrode, a smooth, matted surface is maintained on each of the electrodes.

In the preferred embodiment of the cell of the present invention, during the functioning of the energy cell substantially all of the metal that is dissolved from one electrode is deposited on the second electrode so that during transference of the metal, a relatively constant current is maintained. Another surprising and unexpected result is that during the functioning of the preferred energy cell of the present invention, the chemical composition of the electrolyte is maintained. Restated, during the operation of the preferred cell of the present invention, the ions migrate through the electrolyte, deposit on the second electrode and the concentration of ions and other chemicals in the electrolyte is maintained. This functioning of the cell has important economic consequences. Firstly, the cell of the present invention is capable of providing a relatively constant current. Secondly, the electrolyte can be maintained in the cell almost indefinitely without net chemical changes in its composition. It should be understood that as the preferred cell functions, the mass of one electrode may become depleted so that if the cell is allowed to run, the entire mass of the electrode will be dissolved and plated on the second electrode and the ability of the cell to produce electrical energy will cease. However, after a predetermined mass of one electrode is dissolved and plated on the second electrode, the thermal gradient within the electrolyte can be reversed with the same current density thus reversing the direction of the mass flow of metal ions.

It should be understood that the cell of the present invention can run almost indefinitely as long as the temperature gradient within the electrolyte is reversed periodically to maintain both electrodes within a desired weight and surface area. Thus, as shown in FIG. 1, initially, heat transfer chamber 18 has relatively warm or hot fluid flowing therethrough and heat transfer chamber 17 has relatively cool heat transfer fluid flowing therethrough. As the process continues, and electrode 13 dissolves, the flow of fluid through heat transfer chambers 17 and 18 can be reversed so as to reverse the flow of metal ions. In another embodiment of the invention the consumed electrode is replaced periodically thus avoiding the necessity of reversing the temperature gradient within the electrolyte.

The temperature gradient within the electrolyte can be maintained by any conventional method. For example, one side of the cell can be maintained at room temperature while the other side is cooled. It is believed that the present invention has utility for converting waste heat from electric utility plants into electrical energy and converting heat produced by solar energy into electrical energy. Rather than producing electrical energy for external use from the thermoelectric energy system, the temperature gradient may be used in an electroplating process wherein metal from one electrode is transferred to the object it is desired to plate. In electroplating, the utilization of a temperature differential reduces power requirements for the electroplating process. The thermoelectric system may possibly be used in the electrowinning of metals, particularly the electrowinning of copper.

Generally speaking, the voltage of the cell is proportional to the temperature difference when the cell is connected across a constant electrical load, so that, even the slightest temperature differential will produce a current. However, since this invention is directed to a thermoelectric device for producing useful amounts of current, to obtain increased output of current, it is preferred to operate the hot electrode above 60° Celsius, and operate with a temperature differential between the electrodes of at least 30° Celsius. The temperature of the lower temperature electrode should be determined by the ion concentration in the electrolyte, and the combination of the lower temperature and the ion concentration should not result in the precipitating of salts out of the electrolyte to a degree which would impede the generation of power. In general, when the temperature range is known, then the ion concentration in the electrolyte may be determined so that salts will not crystallize or precipitate out at the lower temperature.

The electrodes can be made of different metals or the electrodes can be made from the same metal. Although the system of the present invention may possibly function when electrodes comprise alloyed metals, it is most preferable that the electrodes comprise elemental or pure metals. The electrolyte must include a compound which provides a source of metal ions of the type desired to be transferred through the electrolyte. The electrolyte must also include a material which forms loose bonds with the metal ions in the electrolyte to provide a metal ion complex which provides for conduction channels for charge transfer. The metal ion complex formed is believed to extend between the electrodes and to provide a flow path for the metal ions. It should be understood that it is possible, and in some instances desirable, for the concentration of the metal ion complex to vary between the electrodes.

In the most preferred form of the present invention the electrodes comprise copper plates which are spaced apart by an electrolyte including a source of copper ions and a source of complexing material for the copper ions. Preferred sources of copper ions are copper salts such as copper fluoroborate and/or copper sulfate.

Examples of copper ion complexing agents are, for example, sources of tartrate, ethylenediaminetetracetic acid (EDTA), and/or gluconate. Preferred sources of tartrate include any one of a mixture of tartaric acid, the Rochelle salt of tartaric acid and cream of tartar. Sources of EDTA include any one or a mixture of ethylenediaminetetracetic acid, ethylenediaminetetracetic acid calcium disodium chelate, ethylenediaminetetraetic acid sodium salt, ethylenediaminetetracetic acid tetrasodium salt and ethylenediaminetetracetic acid trisodium salt. A preferred source of gluconate is gluconic acid. It should be understood that any complexing agent may be used which complexes the ion to be transferred through the electrolyte and which allows for dissolution of metal ions from one electrode into the electrolyte and deposition of metal ions on the second electrode. Although it is believed that they provide low metal ion transfer, complexing agents such as lactic, malic, citric and oxalic acids may have utility in some applications. It is preferred that the complexing compound be added to the electrolyte so that the weight ratio of complexing ions to copper ions is between about 0.01 to about 10.

A preferred electrolyte comprises about one weight percent to saturation of copper sulfate or copper fluoroborate or a mixture thereof and about 1 weight percent to saturation of tartaric acid. A particularly preferred electrolyte includes about 10 to about 45 weight percent copper sulfate and about 1 to about 30 weight percent tartaric acid and a second particularly preferred electrolyte includes about 10 to about 50 weight percent copper fluoroborate and about 1 to about 30 weight percent tartaric acid.

A characteristic that is common with the above-mentioned complexing agents is that the metal ions complexed in the electrolyte extend substantially the entire conduction path between the electrodes. The metal ion complexes appear to function as exchange matrices, that is, they absorb the metal ions without irreversible chemical bonding. Thus, the electrolyte contains a metal ion absorbing or complexing material which extends substantially the entire conduction path between the electrodes. The complexing material may comprise the conventional metal ion complexing agents dissolved in solution as set forth above. As an alternative, the absorbing or complexing material may comprise a silica gel or powder which is added to the electrolyte. The silica ($SiO_2$) may be the sole complexing material used in the cell or the silica may be mixed with the metal ion complexing agents previously discussed.

Although it has been determined that a current output is provided by a cell having an electrolyte having a pH which is basic, it is preferred that the pH of the electrolyte be acidic. It has been found that as a general rule, the current output of the cell increases as the electrolyte becomes more acidic. It is particularly preferred that the pH of the electrolyte be below about 5 and most preferably below about 2.0. The pH of the electrolyte can be adjusted by an acid which does not corrode the electrodes or which does not have substantial adverse affects on the ability of the electrolyte to transfer metal ions. When the cells have elemental copper electrodes, it is preferred that sulfuric acid be used as a pH adjuster with copper sulfate salts and fluoroboric acid with copper fluoroborate salts. Although it is preferred that an aqueous electrolyte be used, it is envisioned that organic solvents such as, for example, pyridine may be used in the apparatus and method of the present invention to provide a liquid electrolyte.

It should be understood that the power output of the thermoelectric energy system is dependent upon many variables such as, for example, the temperature differential, the size of the electrodes, the composition of the electrodes, the composition of the electrolyte, the space between the electrodes, and the electrical resistance of the electrolyte. The power efficiency of a cell of the present invention is, as a general rule, proportional to the heat conduction through the electrolyte. If, for example, the electrodes are located closely together so that the internal electrical conductance is raised, the electrical power output is increased. However, by positioning the electrodes closely together, heat conduction is also increased. The resulting heat flow results in a decrease in the power efficiency. Thus, as should be understood by one skilled in the art, the design of any given cell can be based upon knowledge of this compromise. The power efficiency of the cell can be increased by reducing the thermal conductivity by use of thermal barriers which decrease conduction of heat by convection currents. Efficiency of the cell of the present invention is defined as the electrical energy put out by the cell divided by the heat energy into the cell.

Figure 2:
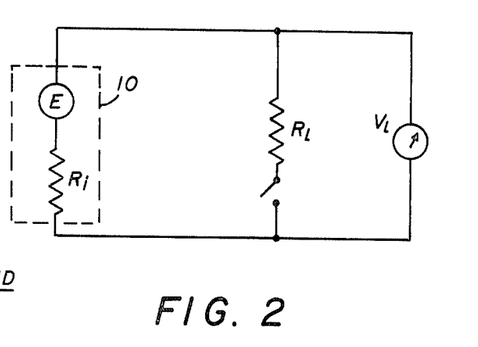
FIG. 2 is a schematic view of circuitry for testing thermoelectric cells.

As was mentioned earlier, the prior art cells are believed to have polarization problems and buildup of scale and caking on the electrodes. A surprising and unexpected result obtained with the use of the present cell is that the polarization problem is reduced and the internal resistance of the cell of the present invention decreases as the current through the cell increases. The manner in which the internal resistance of the cell is measured can best be explained by reference to FIG. 2. When a temperature gradient is imposed within the cell, the cell generates an emf designated as E and has internal resistance designated as $R_i$. The cell is connected to a load such as a resistor designated as $R_L$ and the voltage across the resistor $V_L$ can be measured with a voltmeter. The following is a derivation of the value for the internal resistance of the cell. $V_L$ is the voltage across the resistor $R_L$ when the circuit is closed. E is the open circuit voltage and I is the current through the external circuit.

$$R_i = R_L (E/V_L - 1)$$

$$E = I (R_i + R_L)$$

Another important property of the system of the present invention is that the internal resistance of the cell decreases as the current through the cell increases.

Figure 3:
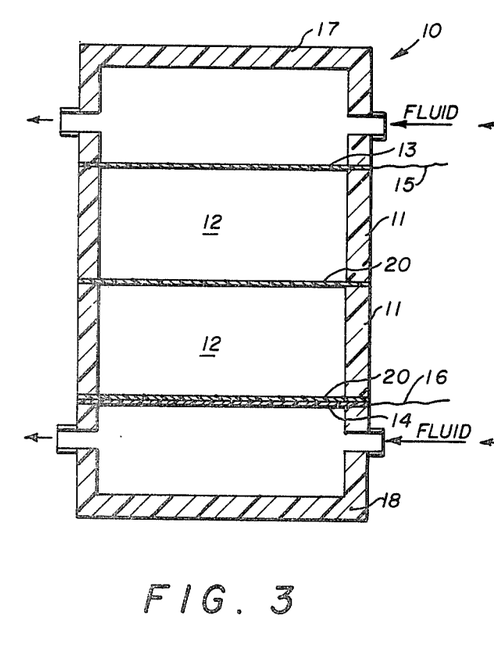
FIG. 3 is a schematic side sectional view of a thermoelectric cell including convection barrier membranes.

It is difficult to maintain the temperature differential in the electrolyte because convection currents tend to develop in the electrolyte and reduce the temperature differential. As shown in FIG. 3, convection barriers 20 are inserted between the electrodes. The use of thermal convection barriers reduce the amount of heat transfer occurring in the electrolyte while maintaining the conductance of the electrolyte. Convection barriers 20 allow for the free migration of copper ions from one electrode to the other and provide thermal insulation between the electrodes while not substantially increasing the resistance between the electrodes. The barriers shown in FIG. 3 comprise a thin membrane. One or more barriers may be used and the barriers may be located adjacent the electrode or spaced between the electrodes. The convection barriers 20 as shown in FIG. 3 are made of a perfluorosulfonic acid membrane such as that sold by DuPont de Nemours and Company under the trademark NAFION. A similar material may be used such as the polyox-phenolic polymer disclosed in U.S. Pat. No. 3,883,784 by Peck et al.

Figure 4:
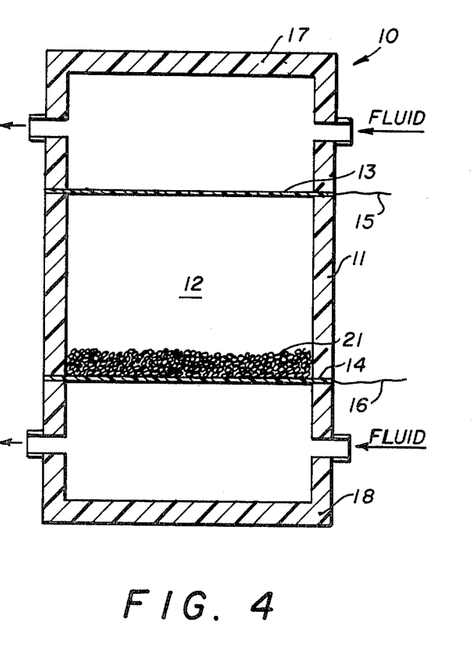
FIG. 4 is a schematic side sectional view of a thermoelectric cell including an amorphous silica convection barrier.

Another embodiment of a convection barrier is shown in FIG. 4. The convection barrier comprises fine particles of amorphous silica 21. Th silica functions in a manner similar to the membrane in that it reduces convection within the electrolyte while maintaining the conductance of the electrolyte between the electrodes. It should be understood that, in general, the convection barrier comprises a physical obstruction which reduces convection in the electrolyte and which provides an ionic path for the metal ions. Other types of convection barriers such as, for example, porous glass, ceramics such as alumina, Bentonite, glass wool and the like may be used. In the case of a copper containing electrolyte, when the complexing agent is added to the copper salts, a precipitate may be produced. For example, when copper sulfate and tartaric acid are combined and heated over a period of time, a precipitate may be formed. The precipitate may or may not be removed. In some instances, it is desirable to leave the precipitate in the electrolyte to provide a convection barrier.

It should be understood that the space between the electrodes can contain material in addition to the electrolyte. More specifically, a matrix saturated with electrolyte may be used. Such matrices should allow for transference of metal ions therethrough and can comprise an inorganic material such as porous ceramics or an organic material such as polymeric matrices including polytetrafluoroethylene. It should be understood that there are many known matrices which can be inserted between the electrodes.

As shown in FIG. 2, the output of the thermoelectric energy cell was determined by measuring the voltage $V_L$, across a predetermined load resistance, $R_i$, which was connected to the electrical outputs of the cell. The surprising and unexpected result obtained by the cell of the present invention is that the current through a load is maintained or slightly increased over a period of time. This current output remains relatively constant until the surface area of one of the copper electrodes is reduced substantially by dissolution. It should be understood that in prior art cells the electrolyte is polarized and results in decay of the current produced by the cell. With the cell of the present invention, the polarization effect is reduced and a cell is provided that can produce a relatively constant current.

As stated earlier, metal dissolves from the cold electrode and plates onto the hot electrode, but the plating percentage can vary. The plating percentage at either the hot or cold electrode is defined as the weight change of the electrode divided by the weight change one would expect if all of the current through the cell over a period of time had been carried only by metal ions in accordance with Faraday's Law. According to Faraday's Law, the following equation should be met when current is attributed solely to the transfer of metal ions:

$$W_{calculated} = \frac{M.Wt.}{Valence \times 96,500} \int_0^t I\, dt$$

Where $W_{calculated}$ is the weight in grams gained or lost by an electrode. M.Wt. is the molecular weight of the metal transferred, Valence is the valence of the metal transferred, I is the current in amperes, and t is time in seconds.

In the case of copper, the molecular weight is 63.54 and the valence is 2. In order to calculate the amount of current flowing from the cell due to the flow of metal ions, the plating percentage is calculated which is defined as the actual weight deposited divided by the weight that would have been deposited if the current was solely a result of metal ion transfer. Thus, in the case of copper the plating percentage is calculated as follows:

$$\text{Plating Percentage} = \frac{\text{Weight gained or lost} \times 1.845 \quad \frac{(\text{ampere-hrs})}{\text{gm}}}{\int_0^t I\, dt\ (\text{ampere-hrs})}\ \%$$

It should be understood that a plating percentage of less than 100% indicates that the cell has generated more current than can be accounted for by the transport of metal ions of that valence between the electrodes. This result indicates that some other mechanism in addition to the transport of metal ions of that valence between the electrodes is responsible for a portion of the current produced by the cell. Thus, in some instances, the plating percentages may possibly be reduced to near 0% so that none of the current is attributable to the transfer of metal ions between the electrodes according to Faraday's Law.

The electrolyte is prepared by dissolving the metal salt and the complexing agent separately in distilled water which is heated and stirred. The mixture of the two solutions is heated and stirred for several hours during which time a powdery pale blue precipitate forms which settles slowly when the stirring is stopped. The precipitate which is formed when preparing the electrolyte may be included in the electrolyte used in the cell in order to promote plating. Cells that utilize an electrolyte containing only the liquid part of the electrolyte with no precipitate, in general, have plating percentages less than about 25%. When a precipitate is included in the electrolyte used in the cell, the plating percentage rises and may approach 100%.

The following examples are illustrative of thermoelectric energy systems according to the present invention.

EXAMPLES

EXAMPLES 1 AND 2

Figure 5:
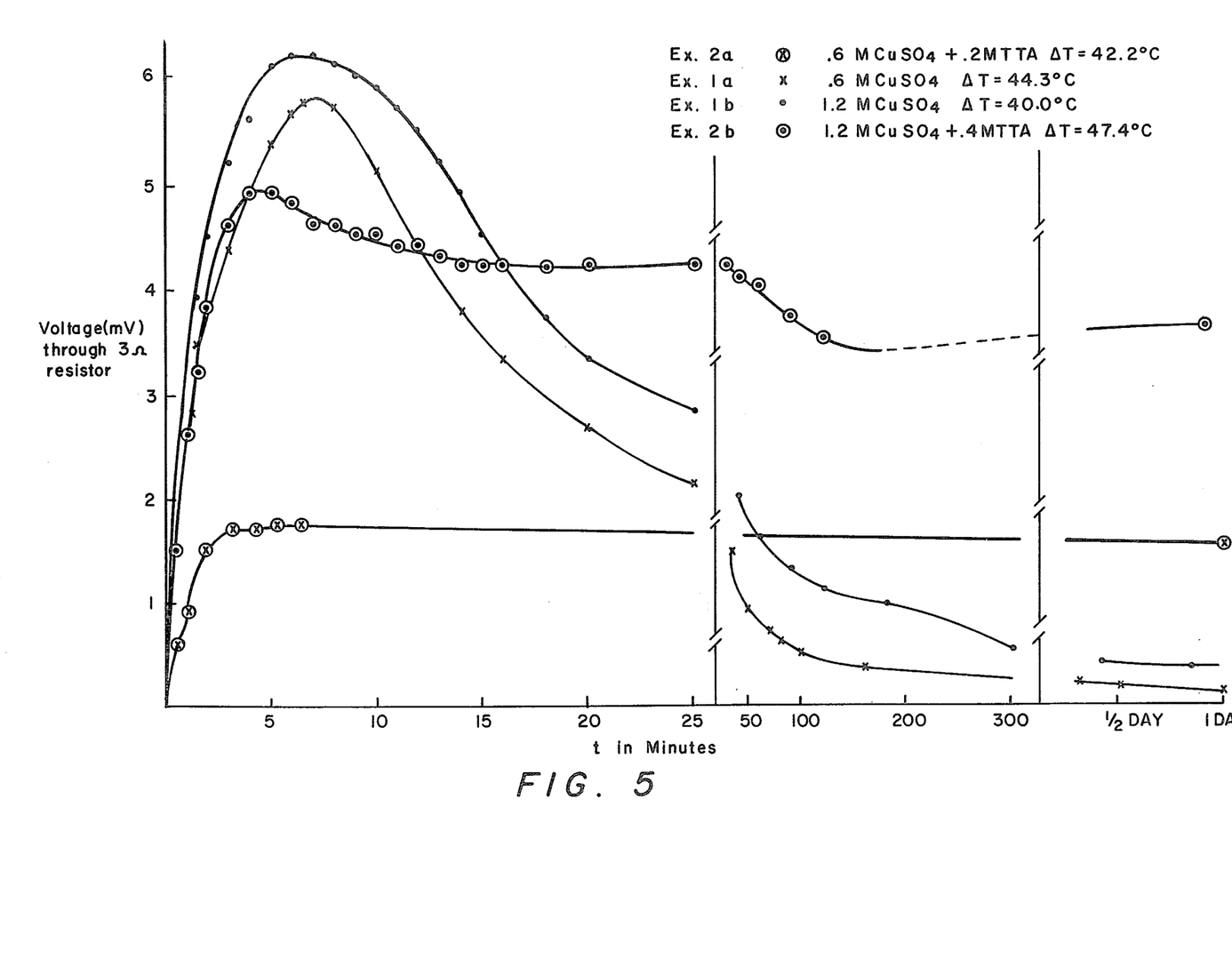
FIG. 5 is a plot of voltage v. time of a cell tested in accordance with Examples 1 and 2.

The following examples were run in a test cell constructed of Teflon including two electrodes made from electrolytically refined copper. The spacing between the electrodes was 1.91 cm and the area of each electrode was 8.1 cm². The cool electrode was cooled by water at approximately 25° C. and the hot electrode was heated by contacting the hot electrode with heated oil to provide a temperature differential as indicated in FIG. 5. The output voltage of the cell was monitored by a high input impedance digital voltmeter and the output current was measured across a 3 ohm resistor in parallel with the voltmeter. In Examples 1a and 1b a copper sulfate electrolyte was used, the respective concentrations being 0.6 M and 1.2 M. In Examples 2a and 2b, electrolytes comprising respectively 0.6 M copper sulfate and 0.2 M tartaric acid; and 1.2 M copper sulfate and 0.4 M tartaric acid were used. The tests were run at constant atmospheric pressure and no precautions were taken to exclude air from the electrolyte.

FIG. 5 shows the change in the voltage across the 3 ohm resistor over a period of time. From the curves, it can be appreciated that the cell of the present invention which included a copper sulfate and tartaric acid electrolyte provided a voltage curve which increased exponentially with time and leveled off to a fairly constant value. In the cells having electrolytes not including the complexing agent, the voltage increased rapidly and then decayed exponentially over a period of time. The exponential decay in the first example is believed to be attributable, at least in part, to the polarization occurring within the cell and scale forming on the electrodes.

EXAMPLES 3, 4, 5, 6 AND 7

A cell of the type described in Examples 1 and 2 was run across a 3 ohm resistor and included a temperature differential of 50° C. In each example, the voltage versus time curve was very similar to the curve shown in Example 2. After the cell was allowed to run at a constant current for a defined amount of time, the cell was taken apart and the electrodes weighed. After each weighing the cell was reassembled using the same electrolyte with a few added milliliters to make up the electrolyte loss during diassembly. Table 1 compares the plating percentage on each electrode.

Table 1 shows that in Examples 3, 4, 5, 6 and 7, the transfer of metal accounted for about 72% of the total amount expected by Faraday's Law if it is assumed that $Cu^{++}$ was being transferred.

EXAMPLE 8

A cell of the same type as described in Examples 1 and 2 was used except that rather than using a Teflon casing, an open glass beaker was used. The bottom of the beaker was heated on a hot plate. The electrolyte comprised 1.6 M copper sulfate and 0.33 M tartaric acid. A convection barrier which was made of amorphous silica sold under the trademark IMSIL A10 (400 mesh and finer) was allowed to settle on the lower hot copper electrode. the electrolyte comprised 25 weight percent amorphous silica. The cell was loaded by a 0.84 ohm resistor and the results of the measurements are displayed in Table 2.

In the case of Example 8, within experimental error, all of the current produced by the cell was accounted for by the amount of metal transferred. Thus, the cool electrode had a 100% plating percentage and the hot electrode had a 94% plating percentage after 81 hours.

EXAMPLES 9, 10, 11 and 12

Examples 9, 10, 11 and 12 demonstrate that the internal resistance of the cell decreases as the current output of the cell increases. The cells used were the same type as in Examples 1 and 2 and the compositions of the electrolyte used in each example were as follows:

Ex. 9: $1MCuSO_4 + .33M$ Tartaric Acid
Ex. 10: $1MCu(BF_4)_2 + .33M$ Tartaric Acid
Ex. 11: $1MCuSO_4 + .33M$ EDTA
Ex. 12: $1MCu(BF_4)_2 + .33M$ EDTA Each of the cells in Examples 9, 10, 11 and 12 was allowed to run at a temperature differential of about 70° C. for 4 days across a 1 ohm resistor. During the fourth day, the resistance of the load on the cell was varied in Examples 9, 10, 11 and 12 as indicated respectively in Tables 3, 4, 5 and 6.

Figure 6:
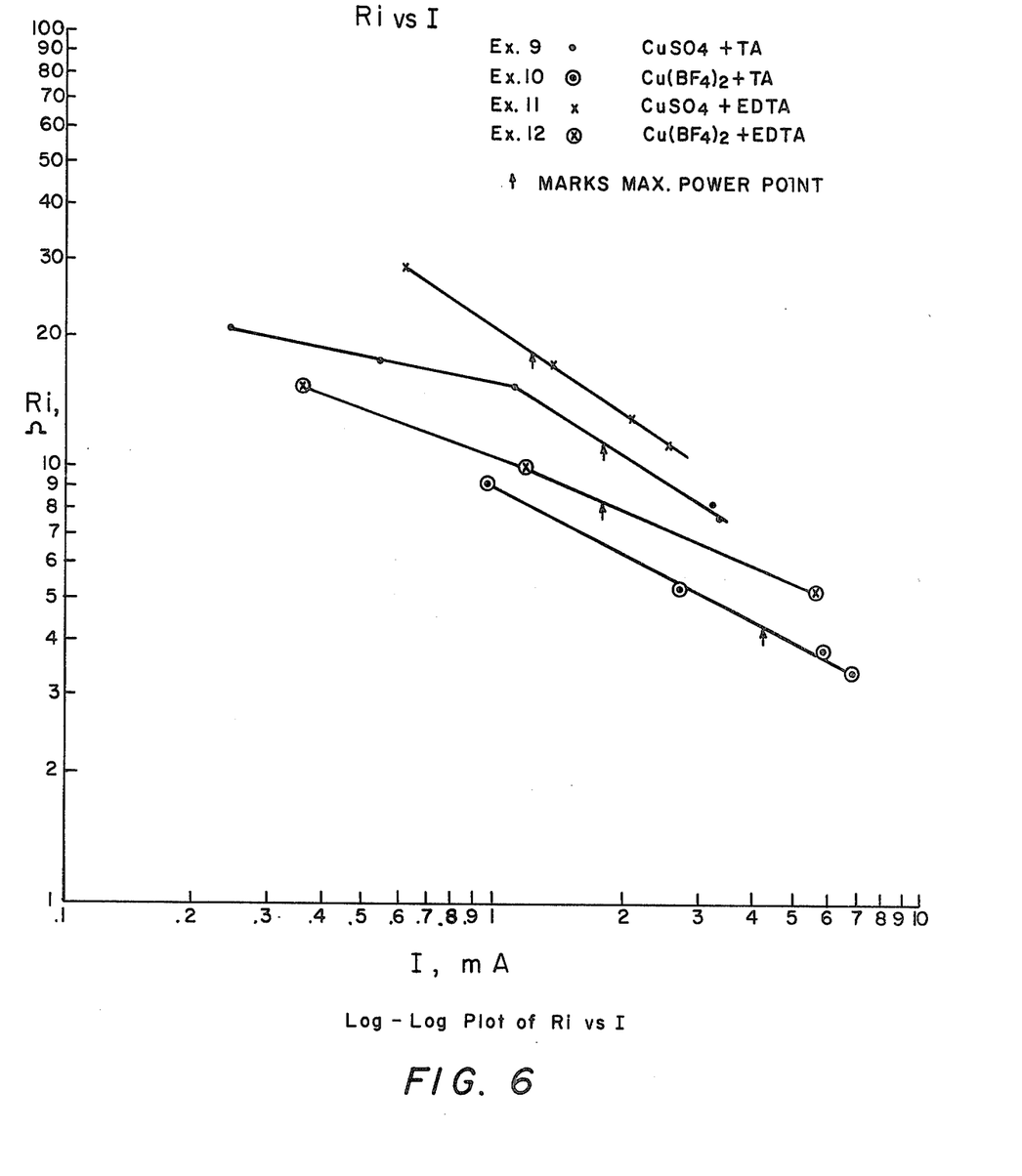
FIG. 6 is a plot of the log of the internal resistance v. the log of the current in accordance with Examples 9, 10, 11 and 12.

As each load resistor indicated in Tables 3, 4, 5 and 6 was connected across the cell, the voltage of the cell was allowed to level off and the reading was taken. After recording of the reading, the resistance was switched. In FIG. 6, the log of the internal resistance versus the log of the current is plotted for Examples 9, 10, 11 and 12. Interpreting FIG. 6, the internal resistance of the cell decreases as the current output is increased.

Table 7 shows the plating percentages obtained after the cells in Examples 9, 10, 11 and 12 were run four days and broken down and the electrodes weighed. It is interesting to note that in each example the plating percentage of the upper electrode which lost copper corresponded, within experimental error, to the plating percentage of the lower electrode which gained copper. Thus, there appeared to be no net change in the concentration of copper ions in the electrolytes. Moreover, when the cells were broken down, the exposed surfaces of the electrodes appeared clean and bright.

TABLE 1

| Day | | Amp Hours | Plating Percentage Upper Electrode Lost | Plating Percentage Lower Electrode Gained |
|---|---|---|---|---|
| start | day 1 | | | |
| Ex 3 | day 3 | .0457 | 66% | 70% |
| Ex 4 | day 4 | .0285 | 73% | 89% |
| Ex 5 | day 5 | .0280 | 70.8% | 81.4% |
| Ex 6 | day 6 | .0278 | 75.8% | 59.7% |
| Ex 7 | day 7 | .0190 | 76.9% | 60.4% |
| | Total | .149 | *Average 71.5% | *Average 72.6% |

*weighted average

TABLE 2

| Time (hrs) | Voltage (mV) | Voltage (mV) open circuit | ΔT(C.°) |
|---|---|---|---|
| 0 | 0 | 0 | 0 |
| 1 | 7.0 | 36 | 43 |
| 3 | 6.0 | 28 | 31 |
| 25 | 5.9 | 27 | 30 |
| 30 | 5.4 | 25 | 28 |
| 35 | 5.7 | 26 | 29 |
| 59 | 6.1 | 26 | 29 |
| 62 | 6.3 | 32 | 36 |
| 69 | 5.6 | 22 | 24 |
| 79 | 7.9 | 30 | 33 |
| 81 | 6.7 | 28 | 31 |

TABLE 3

(Example 9)

$T_u = 27.3°$ C.    $T_L = 69.9°$ C.    $\Delta T = 42.6°$ C.

| $R_L$ (ohm) | $E_L$ (mV) | $R_i$ (ohms) | I (mA) | P (μW) |
|---|---|---|---|---|
| .948 | 3.1 | 7.83 | 3.27 | 10.1 |
| ∞ | 28.7 | | | |
| 96 | 23.6 | 20.7 | .246 | 5.80 |
| 36.7 | 19.4 | 17.6 | .529 | 10.3 |
| 10.3 | 11.4 | 15.6 | 1.11 | 12.6 |
| .66 | 2.1 | 8.36 | 3.18 | 6.68 |

TABLE 4

(Example 10)

$T_u = 27°$ C.  $T_L = 70.2°$ C.  $\Delta T = 43.2°$ C.

| $R_L$ (ohms) | $E_L$ (mV) | $R_i$ (ohms) | I (mA) | P (μW) |
|---|---|---|---|---|
| .958 | 5.5 | 3.87 | 5.74 | 31.6 |
| ∞ | 27.7 | | | |
| 143 | 25.7 | 11.1 | .180 | 4.62 |
| 19.8 | 18.8 | 9.37 | .949 | 17.8 |
| 4.95 | 13.2 | 5.44 | 2.67 | 35.2 |
| .673 | 4.5 | 3.47 | 6.69 | 30.1 |

TABLE 5

(Example 11)

$T_u = 27°$ C.  $T_L = 69.5°$ C.  $\Delta T = 42.5°$ C.

| $R_L$ (ohms) | $E_L$ (mV) | $R_i$ (ohms) | I (mA) | P (μW) |
|---|---|---|---|---|
| .971 | 2.1 | 13.0 | 2.16 | 4.54 |
| ∞ | 30.2 | | | |
| 143 | 20.8 | 64.6 | .145 | 3.03 |
| 19.8 | 12.3 | 28.8 | .621 | 7.64 |
| 4.95 | 6.7 | 17.4 | 11.35 | 9.07 |
| .673 | 1.7 | 11.3 | 2.52 | 4.29 |

Table 6

(Example 12)

$T_u = 27.0°$ C.  $T_L = 68.7°$ C.  $\Delta T = 41.7°$ C.

| $R_L$ (ohms) | $E_L$ (mV) | $R_i$ (ohms) | I (mA) | P (μW) |
|---|---|---|---|---|
| .958 | 3.6 | 5.27 | 5.50 | 29.0 |
| ∞ | 23.4 | | | |
| 96 | 20.2 | 15.2 | .210 | 4.25 |
| 36.7 | 16.5 | 15.3 | .450 | 7.42 |
| 10.3 | 11.9 | 9.95 | 1.16 | 13.7 |
| .66 | — | — | — | — |

TABLE 7

| Example | Plating Percentages (%) Upper (lost) | Lower (gained) |
|---|---|---|
| 9 | 72.0 | 74.4 |
| 10 | 87.2 | 87.8 |
| 11 | 75.3 | 74.1 |
| 12 | 88.5 | 76.7 |

I claim:

1. A thermoelectric energy system comprising:
(a) at least first and second separated electrodes, said electrodes including copper;
(b) a liquid electrolyte comprising a source of copper ions and a material for complexing the ions, the complexing material being selected from the group consisting of one or a combination of a source of tartrate, a source of ethylenediaminetetraacetic acid, a source of gluconate, lactic acid, malic acid, citric acid, oxalic acid, and a source of silicon dioxide, the electrolyte being disposed between and in contact with the electrodes to provide a metal ion conduction path which extends substantially the entire distance between the electrodes;
(c) an electric circuit connected to the electrodes for removal of electrical energy from the system; and
(d) means for establishing a temperature gradient within said electrolyte whereby the average temperature of one of said electrodes will be greater than that of the other of said electrodes to thereby produce a voltage across the electrodes.

2. A system according to claim 1 wherein said electrodes comprise metallic copper.

3. A system according to claim 2 wherein the pH of said electrolyte is below about 2.

4. A system according to claim 3 and further including a convection barrier within said electrolyte and between said electrodes, said barrier reducing convection within the electrolyte and substantially maintaining conductance of the electrolyte between the electrodes.

5. A system according to claim 3 wherein said source of copper ions includes copper sulfate or copper fluoroborate or a mixture thereof.

6. A system according to claim 5 wherein said complexing agent comprises tartaric acid.

7. A system according to claim 6 wherein said electrolyte is an aqueous electrolyte comprising about 1 weight percent to saturation of said source of copper ions.

8. A system according to claim 7 wherein tartaric acid is included in the electrolyte in an amount from about 1 weight percent to saturation.

9. A system according to claim 8 wherein tartaric acid is included in the electrolyte in an amount from about 1 weight percent to about 30 weight percent.

10. A system according to claim 9 wherein said source of copper ions is copper sulfate and the copper sulfate is included in the electrolyte in an amount from about 10 to about 45 weight percent.

11. A system according to claim 9 wherein said source of copper ions is copper fluoroborate and the copper fluoroborate is included in the electrolyte in an amount from about 10 to about 50 weight percent.

12. A system according to claim 3 wherein the difference between said average temperatures is at least about 30° C.

13. A system according to claim 12 and further including a convection barrier disposed within said electrolyte and between said electrodes.

14. A system according to claim 13 wherein said convection barrier comprises a thin membrane which reduces convection and which substantially maintains conductance of the electrolyte between the electrodes.

15. A system according to claim 13 wherein said convection barrier comprises particles of amorphous silica.

16. A system according to claim 3 wherein the pH of the electrolyte is adjusted with sulfuric acid and the source of copper ions is copper sulfate.

17. A system according to claim 2 wherein said electrolyte is acidic.

18. A system according to claim 2 wherein the pH of said electrolyte is below about 5.

19. A system according to claim 1 wherein the complexing material comprises a silica.

20. An electrical device comprising:
(a) at least two separated electrodes comprising copper;
(b) a liquid electrolyte including a source of copper ions and a complexing agent for said copper ions, said electrolyte disposed between and in contact with said electrodes, said complexing agent comprising a material which will form loose bonds with copper ions and being selected from the group comprising a source of tartrate, a source of ethylenediaminetetraacetic acid, a source of gluconate, a source of silicon dioxide or a combination thereof;
means for causing one of the electrodes to have an average temperature which differs from the average temperature of the other electrode whereby a temperature gradient is established within the electrolyte; and an electrical circuit connected between said electrodes whereby current may flow through the electrolyte.

21. A device according to claim 20 wherein said electrodes comprise metallic copper.

22. A device according to claim 21 and further including a convection barrier within said electrolyte and between said electrodes, said barrier reducing convection within the electrolyte and substantially maintaining conductance of the electrolyte between the electrodes.

23. A device according to claim 22 wherein said convection barrier comprises a thin membrane which reduces convection and which substantially maintains conductance of the electrolyte between the electrodes.

24. A device according to claim 21 wherein said source of copper ions includes copper sulfate or copper fluoroborate or a mixture thereof.

25. A device according to claim 24 wherein said complexing agent comprises a source of tartrate.

26. A device according to claim 25 wherein said electrolyte is an aqueous electrolyte comprising about 1 weight percent to saturation of said source of copper ions.

27. A device according to claim 26 wherein tartaric acid is included in the electrolyte in an amount from about 1 weight percent to saturation.

28. A device according to claim 27 wherein tartaric acid is included in the electrolyte in an amount from about 1 weight percent to about 30 weight percent.

29. A device according to claim 28 wherein said source of copper ions is copper sulfate and the copper sulfate is included in the electrolyte in an amount from about 10 to about 45 weight percent.

30. A device according to claim 28 wherein said source of copper ions is copper fluoroborate and the copper fluoroborate is included in the electrolyte in an amount from about 10 to about 50 weight percent.

31. A device according to claim 26 wherein said means for causing one electrode to assume a different temperature from the other electrode provides an average temperature difference across the electrolyte of at least about 30° C.

32. A device according to claim 31 and further including a convection barrier disposed within said electrolyte and between said electrodes.

33. A device according to claim 32 wherein said convection barrier comprises particles of amorphous silica.

34. A device according to claim 26 wherein said electrolyte is acidic.

35. A device according to claim 34 wherein the pH of said electrolyte is below about 5.

36. A device according to claim 35 wherein the pH of the electrolyte is adjusted with sulfuric acid and the source of copper ions is copper sulfate.

37. A device according to claim 20 wherein said complexing material comprises a silica and the pH of said electrolyte is below about 2.

38. A method of converting thermal energy into electrical energy comprising the steps of:
preparing an electrolyte, the step of preparing the electrolyte including:
selecting an aqueous solution of a copper salt;
adding to the solution a material which will form loose bonds with metal ions in the solution; and
adjusting the pH of the solution to be less than 5;
immersing at least portions of a pair of electrodes in the electrolyte, the electrodes comprising copper and being spacially separated;
causing the average temperature of one of the electrodes to differ from that of the other electrode whereby a temperature gradient is established in the electrolyte; and
connecting an electrical circuit in series with the electrodes and electrolyte whereby current may flow.

39. The method of claim 38 wherein the step of adjusting the pH comprises adding an acid to the electrolyte until the pH is below 2.

40. The method of claim 38 further comprising:
positioning a convection barrier within the electrolyte and between the electrodes.

41. The method of claim 38 wherein the step of adding to the electrolyte a material which will form loose bonds with ions comprises:
mixing with the electrolyte a complexing agent selected from the group comprising a source of tartrate, a source of ethylenediaminetetraacetic acid, a source of gluconate, a source of silicon dioxide, lactic acid, malic acid, citric acid and oxalic acid.

42. The method of claim 41 wherein the step of adjusting the pH comprises adding an acid to the electrolyte until the pH is below 2.

* * * * *